United States Patent [19]

Kawaai et al.

[11] Patent Number: 5,344,001
[45] Date of Patent: Sep. 6, 1994

[54] CONVEYOR CHAIN WITH PROTECTIVE COVERS

[75] Inventors: Yuichi Kawaai, Daito; Katsutoshi Shibayama, Osaka; Tetsuya Murano; Susumu Hamaguchi, both of Hirakata; Tomoo Suko, Katano, all of Japan

[73] Assignee: Tsubakimoto Chain Co., Japan

[21] Appl. No.: 22,191

[22] Filed: Feb. 25, 1993

[30] Foreign Application Priority Data

Feb. 28, 1992 [JP] Japan .................................. 4-18228
Mar. 4, 1992 [JP] Japan .................................. 4-19915

[51] Int. Cl.⁵ .............................................. B65G 17/24
[52] U.S. Cl. .................................................. 198/779
[58] Field of Search ..................................... 198/779

[56] References Cited

U.S. PATENT DOCUMENTS 4,718,543 1/1988 Leisner et al. .................... 198/779
4,736,834 4/1988 Kotegawa et al. ................ 198/779
5,035,318 7/1991 Kawabata et al. ................ 198/779

Primary Examiner—Joseph E. Valenza
Attorney, Agent, or Firm—Eugene E. Renz, Jr.

[57] ABSTRACT

A conveyor chain having a large diameter load-carrying roller and a small diameter running roller coaxially mounted on a connecting pin which alternately connects an inner link plate with an outer link plate, a cover mounted on said link plate of a configuration to cover a gap between adjacent load-carrying rollers and a gap between adjacent running rollers preventing entrance of foreign matter. Included are chain covers covering sideways the inner and outer link plates and travelling rollers of the conveyor chain, and gap covers for preventing entrance of foreign substances which covers the gap between adjacent loading rollers and also covers the gap between adjacent travelling rollers. The gap covers have a projection portion in a position between adjacent loading rollers having a surface which is lower than an outside diameter of the loading rollers and higher than lower surfaces of the chain covers.

8 Claims, 8 Drawing Sheets

CONVEYOR CHAIN WITH PROTECTIVE COVERS

FIELD OF THE INVENTION

The present invention relates to improvements in conveyor chains comprising a series of large diameter load carrying rollers and small diameter running rollers coaxially mounted on a connecting pin, and more specifically to an assembly incorporating a novel cover design preventing foreign matter from damaging the conveyor or interfering with its operations.

BACKGROUND OF THE INVENTION

Conveyors of the type to which the present invention relate typically convey loads on the load carrying rollers at a higher speed than the speed of the chain itself, and at the same time run only the chain with the loads held on the rollers when required. The systems usually include chain covers covering sideways the inner and outer link plates and the traveling rollers of the conveyor chain.

This type of chain conveyor system is capable of conveying articles on the loading rollers at a higher speed then the traveling speed of the chain itself and, if need be, can cause the articles to dwell and permit only the chain to travel. This feature is used to accumulate articles. These conveyor chains are often utilized for load carrying and assembly operations. However, it has been found that in conveyors of this general type, foreign matter, such as a bolt or nut if loosened during an assembling operation, will be entrained or caught in the chain, and that when this happens damage to the rollers is possible and this may cause shutdown of the conveyor. For this reason, these conveyors have been fitted with protective covers to prevent damage to the rollers and shutdown of the conveyor due to entrainment of foreign matter.

One such prior cover is disclosed in Japanese Utility Model 197610/1987. FIGS. 12 and 13 show the details of this cover. The cover is generally designated by the numeral 50 and is of a flat plate type formed integrally with the link plates 52 and 54 which connect adjacent links. This cover has certain disadvantages and drawbacks. For example, since the cover 50 is of a flat plate type, there is a gap between the cover and the running roller 58. Foreign matter, such as a nut or bolt, may drop into the chain through this gap and thus the cover 50 does not truly function to prevent damage to the rollers, and stoppage of the chain under all operating conditions. Further the cover 50 is located radially outwardly of the outer diameter of the small diameter running roller 58. Thus, the small diameter running roller 58 cannot be received by a rail on the return side of the chain. Consequently, a large diameter load carrying roller 56 runs on the rail. Therefore, abrasion powder present on the rail adheres to the load carrying roller 56, the carrying side of the chain, and adheres to the load being carried.

Furthermore, even though chain cover 60 covers the chain and is utilized to prevent entrance of foreign matter, it has been found that dust which deposits on the cover 50 migrates into the chain without any resistance through the space between the cover 50 and each chain cover 60.

Moreover, on the return side of the chain, the load carrying roller 56 travels on the rail and this adversely effects the stability of the chain as compared with the running roller 58 riding on the rail.

SUMMARY OF THE INVENTION

With the foregoing in mind, it is an object of the present invention to provide a cover assembly for a conveyor chain characterized by novel features of construction and arrangement which obviates some of the problems of the prior art discussed above. To this end, in a conveyor chain having a large diameter load carrying roller and a small diameter running roller both coaxially mounted on a connecting pin which alternately connects an inner link plate with an outer link plate, covers connected to the link plates are provided which span the gap between the adjacent load carrying rollers and the gap between adjacent running rollers thereby preventing entrance of foreign matter and solving the problems described above. Accordingly, if a bolt or nut is accidentally dropped during the use of the conveyor chain, the cover will prevent it from entering the gaps between the load carrying rollers and the running rollers and causing damage to the rollers and interfering with the normal operation of the chain.

The cover is preferably located inside, in the radial direction of the outer diameter of the running roller, between the adjacent running rollers and by reason of this configuration, the running rollers can be received on the return side of the rail as well as on the running side. Accordingly, abrasion powder will not adhere on the load carrying roller which rotate in contact with the loads supported by the conveyor. Furthermore this results in a stabilized operation of the chain on the return side.

In the preferred embodiment of the invention, the cover includes flexible locking elements for detachably mounting the cover in place, and the inner and outer link plates have window openings in the form of holes or cutouts to receive the locking elements. The flexible locking fingers of the cover engage in the window holes or cutouts of the inner link plates from the outside and with the window holes or cutouts of the outer link plates from the inside. This arrangement provides for ease of installation and removability of the cover, and insures smooth chain operation by reason of the absence of any projections in the direction of the width of the chain.

In accordance with an embodiment of the invention, the chain conveyor system of the present invention includes gap covers and chain covers. The chain covers overlie sideways the inner and outer link plates and traveling rollers of the conveyor chain. The conveyor chain also includes a gap cover which overlies the gap between adjacent loading rollers and also covers the gap between adjacent traveling rollers to prevent ingress of foreign matter. The gap cover includes a projecting portion, located between adjacent loading rollers, having an upper surface which is disposed below a plane of the outer diameter of the loading rollers and higher than the lower surfaces of the chain covers. The surface of the projecting portion, which closes the gap between adjacent loading rollers, is higher than at least the lower surfaces of the chain covers, thereby forming a labyrinth between the gap cover and the chain covers and thereby positively blocking the entry of foreign matter into the chain.

Further, since the surface of the projecting portion of the gap cover between adjacent loading rollers is higher than the upper surface of the chain covers, foreign matter, including abrasion dust particles, accumulates mainly on the chain covers effectively blocking entry into the inside of the chain covers.

BRIEF DESCRIPTION OF THE DRAWINGS

These and other objections of the present invention and the various features and details of the operation and construction thereof, are herein after more fully set forth with reference to the accompanying drawings, wherein.

DETAILED DESCRIPTION OF THE PREFERRED EMBODIMENT

Figure 1:
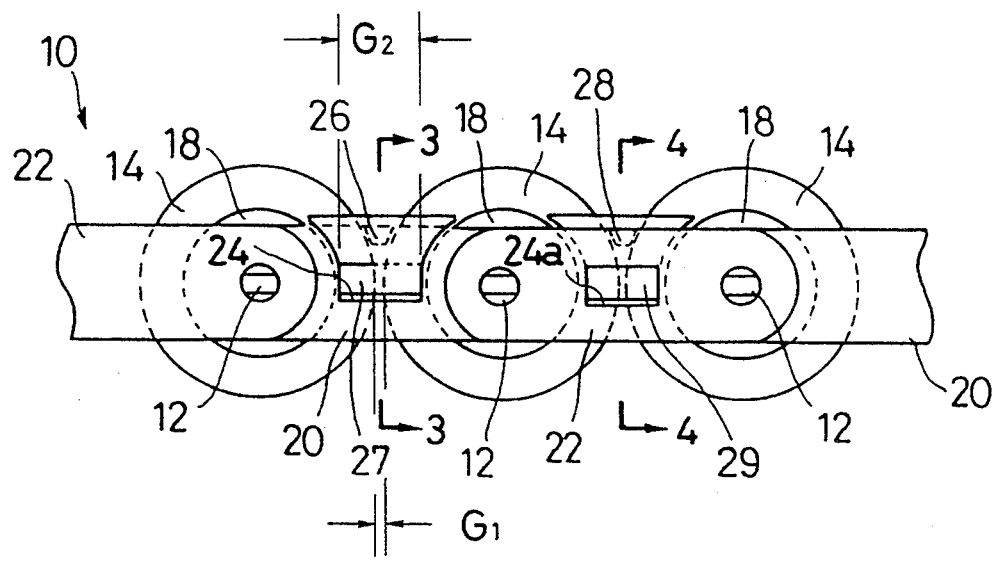
FIG. 1 is a fragmentary side elevational view of a conveyor chain in accordance with the present invention.
Figure 2:
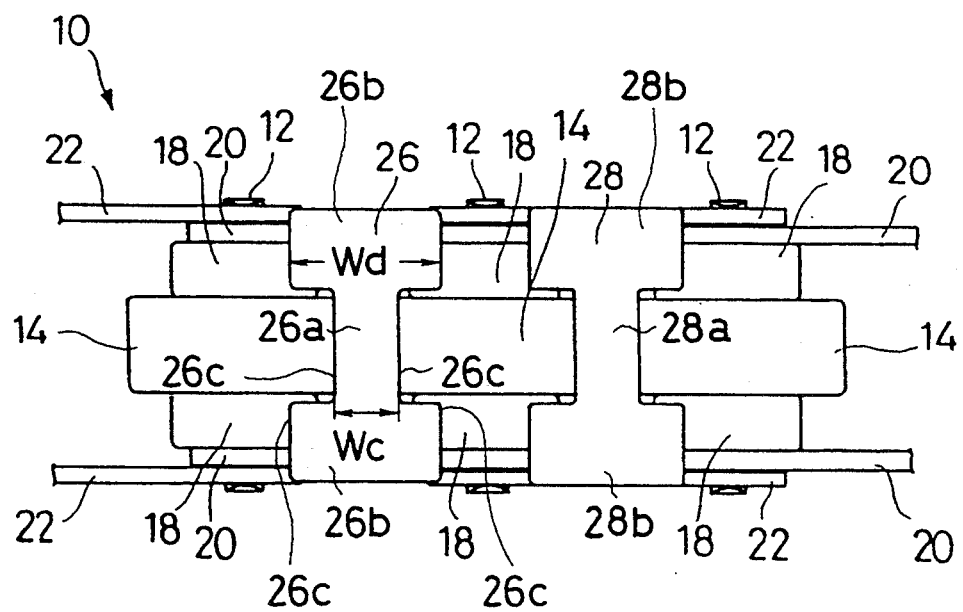
FIG. 2 is a plan view of the conveyor chain shown in FIG. 1.

Referring now to the drawings, there are illustrated various embodiments of conveyor chains in accordance with the present invention including covers preventing the ingress of foreign matter to operating parts of the conveyor chain. These chains typically comprise a plurality of rollers pivotally connected by links to form a closed loop adapted for movement in an endless path.

Considering now the first embodiment of the invention which is best illustrated in FIGS. 1-4, inclusive, the conveyor chain 10 comprises plurality of large diameter load carrying rollers 14 for supporting a load and a pair of small diameter running rollers 18 on either side of the large diameter rollers 14 mounted coaxially therewith by means of a pin 12. The running rollers 18 ride on rails 16. The load carrying rollers 14 and the running rollers 18 are independently rotatably mounted on pin 12 so that they can rotate relative to one another. In accordance with this embodiment of the invention, the load carrying rollers 14 and the running rollers 18 are made of a resin. However, they may be made of other suitable materials such as metal.

Figure 3:
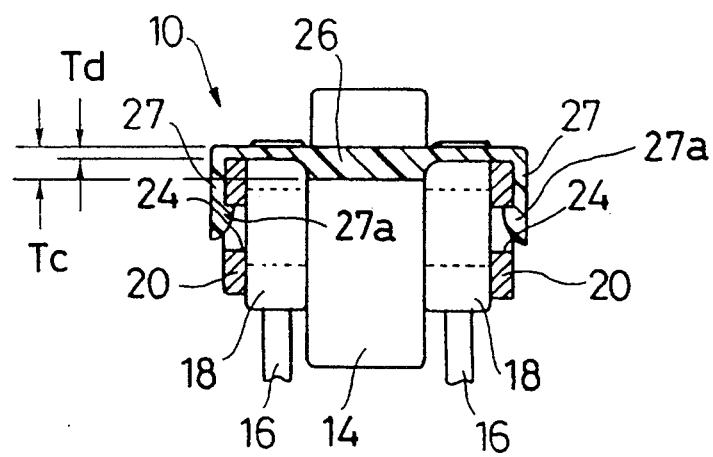
FIG. 3 is a sectional view taken along lines 3—3 of FIG. 1 showing a first embodiment of a conveyor chain made in accordance with the present invention.
Figure 4:
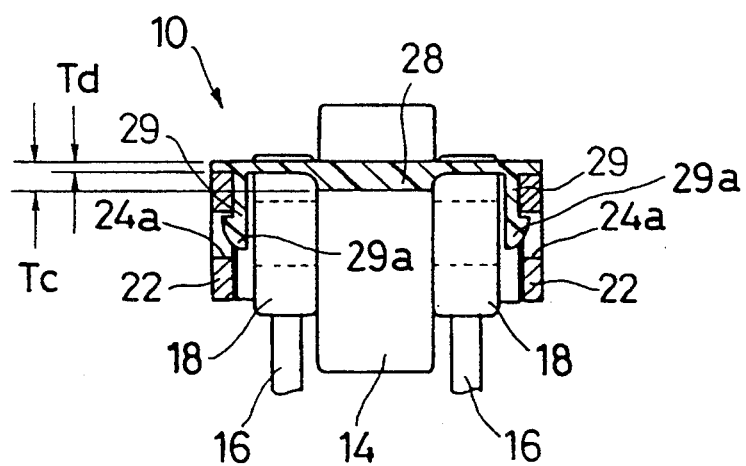
FIG. 4 is a sectional view taken along lines 4—4 of FIG. 1.
Figure 5:
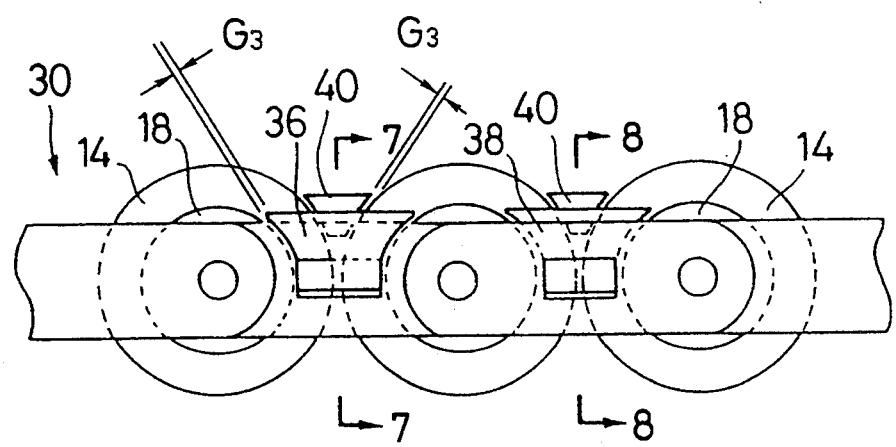
FIG. 5 is a fragmentary elevational view of another embodiment of cover for a conveyor chain in accordance with the present invention.
Figure 6:
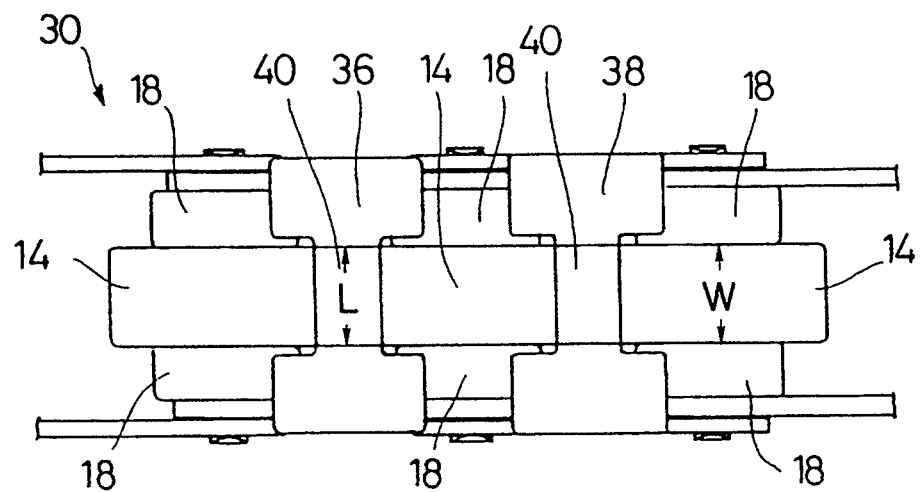
FIG. 6 is a plan view of the conveyor chain of FIG. 5.

The rollers 14 and 18 are connected by inner and outer link plates 20 and 22 which have window openings or ports 24 therein. In accordance with the present invention, covers are provided which overlie the juncture or gap G between adjacent rows of rollers to prevent the ingress of foreign matter. The covers, as best illustrated in FIGS. 3 and 4, include a top plate 26 of I-shaped configuration defining a narrow generally rectangular central section $26^a$, overlying the gap $G_1$ between adjacent load carrying rollers 14, and enlarged rectangular outer portions $26^b$ overlying the gap $G_2$ between adjacent small diameter rollers 18. As best illustrated in FIG. 3, the profile of the opposing side edges $26^c$ of the cover closely follow the profile of the rollers 14 and 18 to provide a running clearance which is very small and insures free rotation of the rollers and excludes passage of foreign matter.

The covers 26, 28 are provided with flexible locking fingers for mounting them in place in the positions shown and described. Thus the cover 26 has depending locking fingers or tabs 27 which depend from outer portions $26^b$ of the cover 26 and have an inwardly directed tang $27^a$ which engages over the inner link plates 20 and snaps into the window opening 24. The alternate covers 28 have similar depending locking fingers 29 with radially outwardly directed locking tangs $29^a$ which engage in the openings $24^a$ of the links 22 from the inside. These locking fingers 29 depend from the outer portion $28^b$ the cover inwardly of the outer top side edges $28^b$ which overly the upper face of the outer links 22.

The covers 26 and 28 which prevent entrance of foreign matter utilize elasticity and a predetermined dimensional relationship to the load carrying roller 14 and the running roller 18 to maintain a non-contact state with a slight gap between the cover and the outer peripheral surfaces of the rollers Note the center section $26^a$, $28^a$ of the covers 26 and 28 are of smaller transverse width $W_c$ then the width $W_d$ of the outer end portions of the top. The thickness $T_c$ of the center section $26^a$, $28^a$ is greater than the thickness $T_d$ of the outer end portions $26^b$, $28^b$ which provides greater flexibility of the outer portions $26^b$, $28^b$ to aid in assembly.

There is shown in FIG. 5-8 inclusive, another embodiment of cover for a conveyor chain in accordance with the present invention. The conveyor chain is generally designated by the number 30. This conveyor chain is generally similar to that described previously except that in the present instance the covers 36 and 38 include a central upstanding projection 40 on the central portion of the top of the cover of a transverse length "L" approximately equal to the width "W" of the load carrying roller 14.

Figure 7:
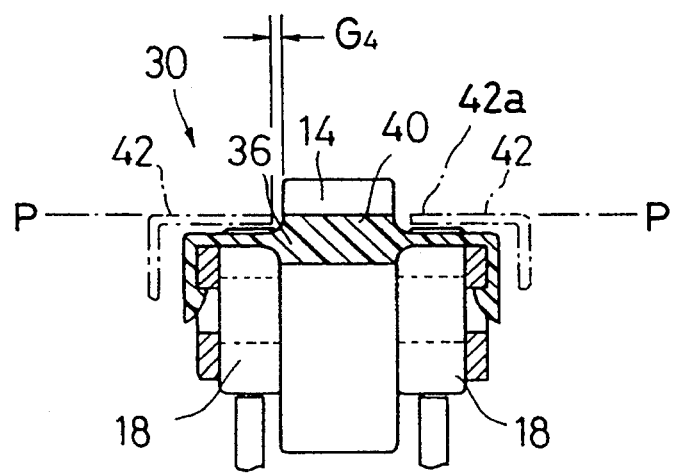
FIG. 7 is sectional view taken along lines 7—7 of FIG. 5 of the second embodiment of a conveyor chain according to the present invention.
Figure 8:
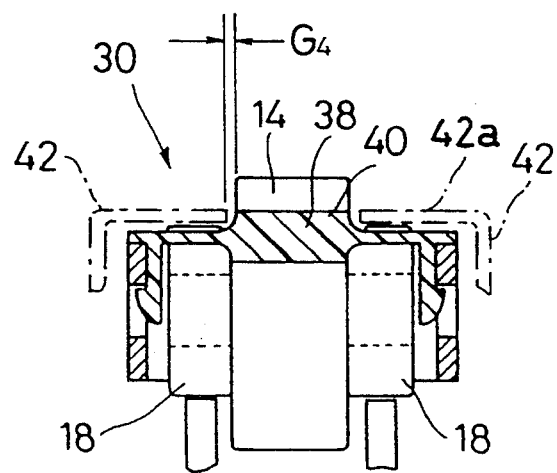
FIG. 8 is sectional view taken along lines 8—8 of FIG. 5.

The chain conveyor 30 is suitable for use with an outer cover 42 shown in broken lines. The height of the projection 40 is such that it lies flush and in the same plane P-P with the upper surface $42^a$ of the outer cover 42. As best illustrated in FIGS. 7 and 8, there is a slight gap G₄ between the outer cover 42 and the large diameter roller 14.

The covers 36 and 38 may be assembled with a slight gap G₃ relative to the rollers 14 and 18 of a sufficient dimension to prevent ingress of foreign matter onto the chain 30. The covers 36 and 38 used in combination with an outer cover 42 are particularly suitable for use in clean room operations.

Figure 9:
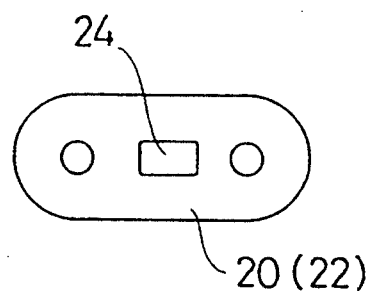
FIG. 9 is a side elevational view of a link plate forming part of a conveyor chain in the embodiments of the invention illustrated.
Figure 10:
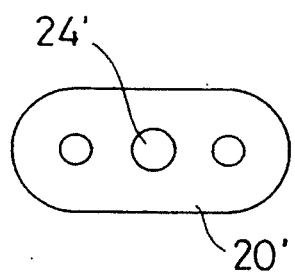
FIG. 10 is a side elevational view of another embodiment of a link plate used in a chain conveyor in accordance with the present invention.
Figure 11:
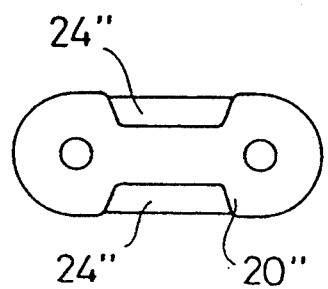
FIG. 11 is a side elevational view of still another embodiment of a link plate usable in a conveyor chain in accordance with the present invention.
Figure 12:
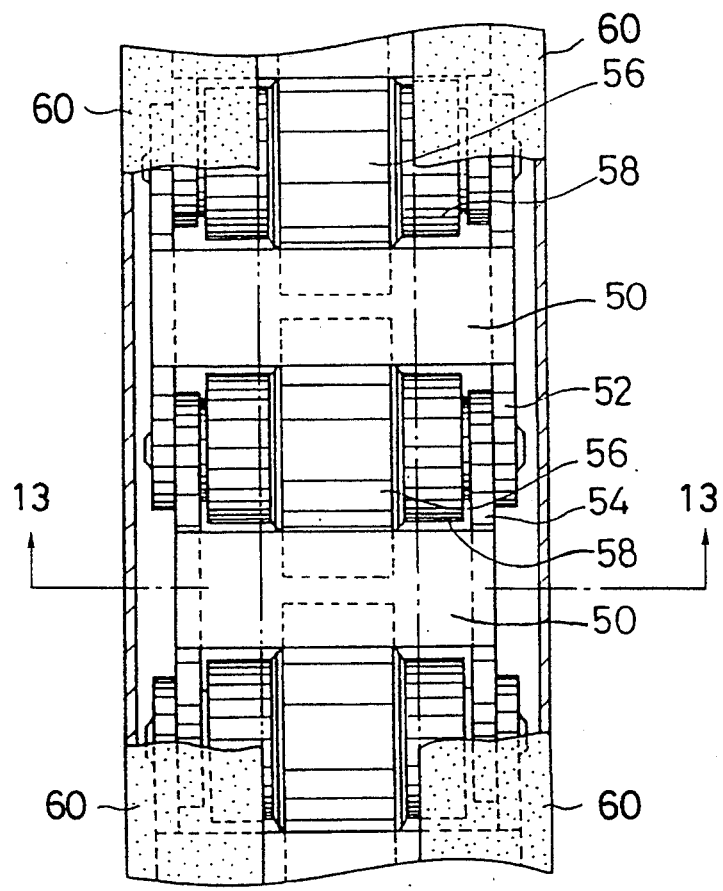
FIG. 12 is a fragmentary plan view of a conventional conveyor chain and designated prior art.
Figure 13:
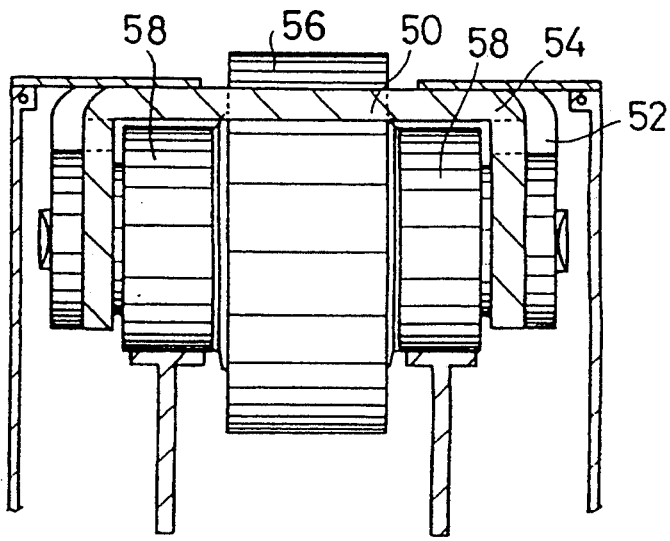
FIG. 13 is an enlarged sectional view taken on the line 13,13 of FIG. 12.
Figure 14:
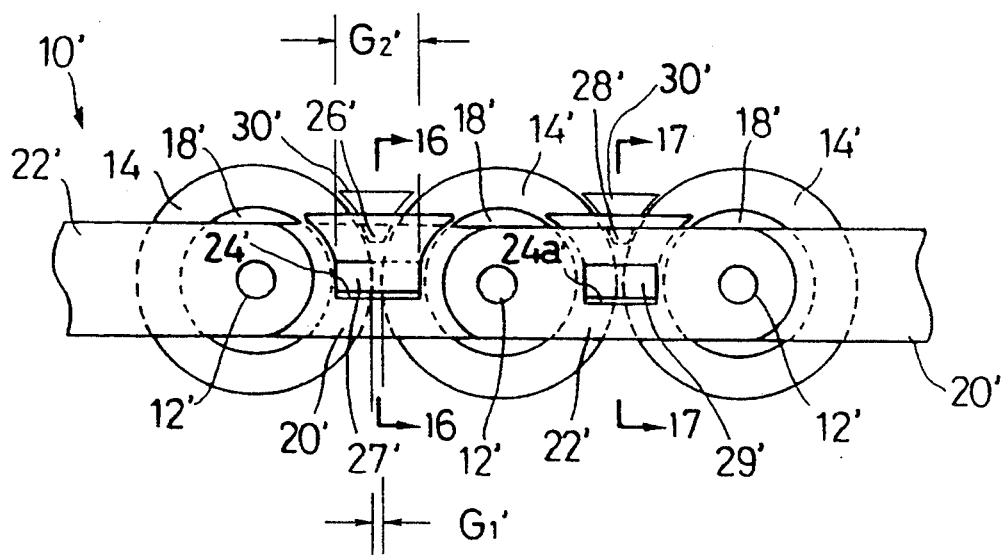
FIG. 14 is a front elevational view of a conveyor chain including chain and gap covers in accordance with the present invention.
Figure 15:
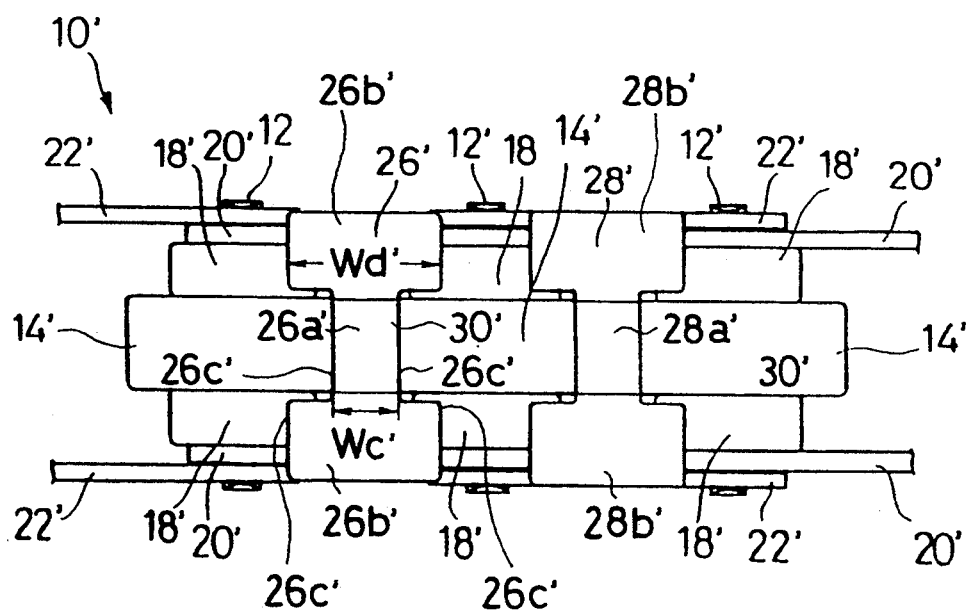
FIG. 15 is a plan view of the conveyor chain shown in FIG. 14.
Figure 16:
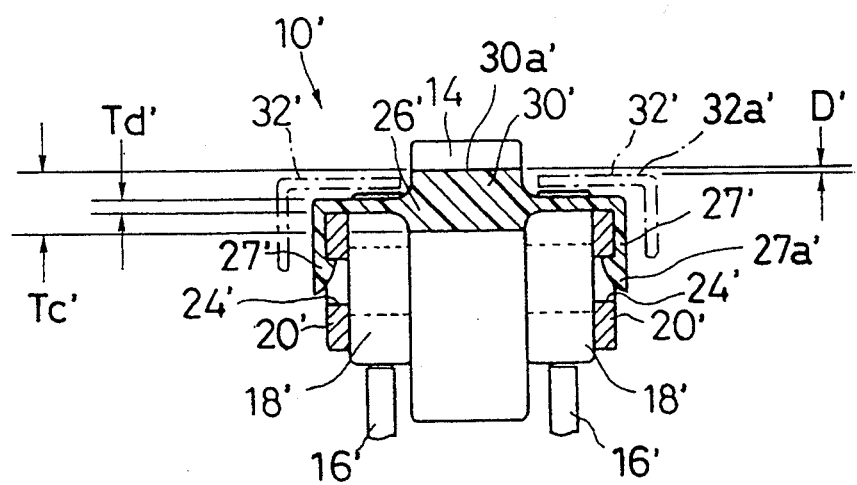
FIG. 16 is a sectional view taken along lines 16—16 of FIG. 14 showing chain and gap covers in accordance with the present invention.
Figure 17:
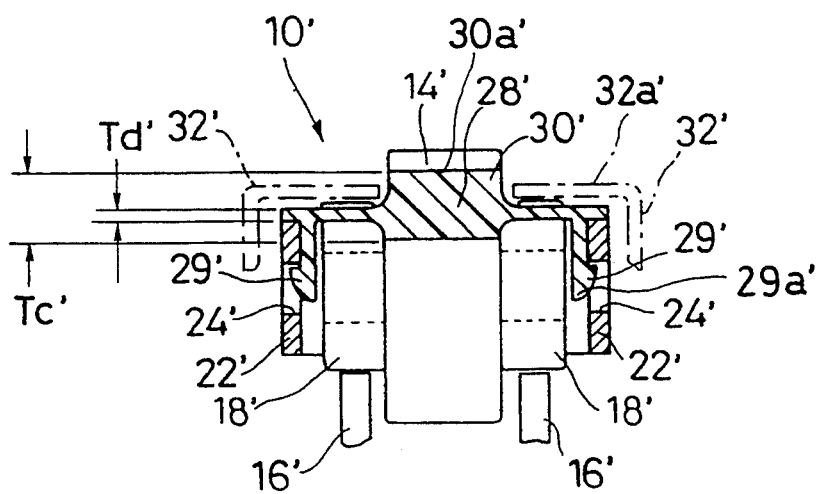
FIG. 17 is a sectional view taken along lines 17—17 of FIG. 14.

Illustrated in FIGS. 9-11, inclusive, are typical link plate configurations for use in chain conveyors in accordance with the present invention. FIG. 9 shows a link plate 20, 22 suitable for use in the embodiments wherein the window opening 24 is of rectangular shape and formed at the center of the link. FIG. 10 shows a link plate 20' wherein the window opening 24' is spherical in shape and is centrally located. FIG. 11 shows a link plate 20'' having cutouts 24'' in the upper and lower side edges. As described previously, the locking tangs 27$^a$, 29$^a$ of the locking fingers 27, 29 flexibly engage in the window holes 24, 24' or cutouts 24'' in the manner described above.

Recapping briefly the salient features of the present invention, the cover configuration of the present invention overlies the gaps between the load carrying rollers 14 and the running rollers 18 to prevent the entrance of foreign matter and obviate accidents of the type wherein foreign matter, such as bolts or nuts, enter the chain to cause damage or interrupt normal operation. Further, since the link plates are in a non-contact state providing a slight gap with the load carrying and running rollers, there is no interference with the normal rotation of the rollers and accordingly no abrasion powder is formed in cases where the rollers are made from a resin material. Thus the conveyor chain is particularly suited for use in instances requiring a clean environment.

Additionally, since the configuration of the cover permits installation in the radial direction inside of the outer diameter of the small diameter running roller, the conveyor chain can receive the running roller with a rail on the return side of the chain. This prevents abrasion powder or the like from accumulating on the load carrying rollers which rotate in contact with the loads being supported. Furthermore, by this arrangement on the return side, the chain can operate with stability.

In accordance with another feature the present invention, the covers can be easily installed and removed from the link plate and the configuration is such that there is no projection in the direction of the width of the chain thereby enabling smooth operation of the chain.

There is shown in FIGS. 14-17, inclusive, another embodiment of the present invention. In accordance with this embodiment the covers 26' and 28' each have a projecting portion 30' in the form of an upstanding rib which projects from the upper surface of the cover. The rib 30' is located radially inwardly of the outside diameter of the loading roller 14' to prevent interference thereof with articles being conveyed.

The conveyor chain 10' also includes chain covers 32', 32' which overlie the inner and outer link plates 20', 22' and the traveling rollers 18', 18'. The upper surface 30$^{a'}$ of the rib 30' projects above the upper surface 32$^{a'}$ of the chain covers 32', 32' by a predetermined distance D'.

Recapping briefly the salient features of the above described embodiment of the present invention, since the chain conveyors overlie and cover most of the elements of the chain, the chain cover and gap covers 26', 28' of the present invention provide an effective barrier to prevent entrance of foreign matter to a point where it is difficult for foreign matter, such as abrasion dust and the like, to enter the chain portion.

Further, the arrangement of the surface 30$^{a'}$ of the projecting portion 30' of the gap cover 26' and 28' is higher than the lower surfaces of the chain covers which are opposed to each other in the transverse direction. This provides a barrier and makes it difficult for foreign matter, such as abrasion dust, to enter the chain portion between the gap covers 26', 28' and the chain covers 32'. Additionally, since the surface 30$^{a'}$ of the rib 30' is higher than the upper surfaces 32$^{a'}$ of the chain covers 32', foreign matter on the gap covers 26', 28' will drop into the chain covers 32' and thus will not be deposited on the gap covers 26', 28'. In view of the above, the system of the present invention is particularly suited for conveyance and assembly of products which are apt to be affected by particulate foreign matters such as dust.

Even though particular embodiments of the present invention have been illustrated and described wherein, it is not intended to limit the invention and changes and modification may be made therein within the scope of the following claims.

What is claimed is:

1. A chain conveyor system comprising a conveyor chain and including loading rollers of a large diameter and travelling rollers of a small diameter coaxially mounted on connecting pins for connecting inner and outer link plates in an alternate manner and chain covers covering sideways said inner and outer link plates and travelling rollers of said conveyor chain, characterized in that:

a gap cover for preventing entrance of foreign substances which covers the gap between adjacent loading rollers and also covers the gap between adjacent travelling rollers; and said gap cover having a projection portion in a position between adjacent loading rollers having a surface which is lower than an outside diameter of the loading rollers and higher than lower surfaces of the chain covers.

2. A chain conveyor system according to claim 1, wherein the surface of said projecting portion is higher than upper surfaces of said chain covers.

3. A conveyor chain having a large diameter load-carrying roller and a small diameter running roller coaxially mounted on a connecting pin which alternately connects an inner link plate with an outer link plate, comprising a cover mounted on said link plates of configuration to cover a gap between adjacent load-carrying rollers and a gap between adjacent running rollers preventing entrance of foreign matter; said covering having flexible engaging pieces; and said inner link plate and said outer link plate having a window hole or a cutout, so that said engaging pieces engage with said window hole or said cutout of said inner link plate from outside and of said outer link plate from inside.

4. A conveyor chain having a large diameter load-carrying roller and a small diameter running roller coaxially mounted on a connecting pin which alternately connects an inner link plate with an outer link plate, comprising a cover mounted on said link plates; said cover having a section to cover a gap between adjacent load-carrying rollers and another portion to cover a gap between adjacent running rollers preventing entrance of foreign matter, the width of said other portion being different from that of said section.

5. A conveyor chain as claimed in claim 4, wherein the top surface of said cover is located below the upper end of said running rollers.

6. A conveyor chain as claimed in claim 4, wherein said cover has flexible engaging pieces; said inner link plate and said outer link plate have a window hole or a cutout, so that said engaging pieces with said window hole or said cutout of said inner link plate from outside and of said outer link plate from inside.

7. A conveyor chain as claimed in claim 4, wherein the width of said portion is larger than that of said section.

8. A conveyor chain as claimed in claim 7, wherein the top surface of said cover is located below the upper end of said running rollers.

* * * * *